(12) United States Patent
Wegeng et al.

(10) Patent No.: US 8,041,489 B2
(45) Date of Patent: Oct. 18, 2011

(54) METHOD FOR CONTROLLING A TRANSMISSION DURING ACCELERATION FROM IDLE

(75) Inventors: William J. Wegeng, Avon, IN (US); Peter Edwin Swingler, Carmel, IN (US); Edmond M. Etchason, New Palestine, IN (US); Barry Lewis Ladd, Zionsville, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 565 days.

(21) Appl. No.: 12/257,207

(22) Filed: Oct. 23, 2008

(65) Prior Publication Data
US 2009/0281696 A1 Nov. 12, 2009

Related U.S. Application Data

(60) Provisional application No. 61/052,483, filed on May 12, 2008.

(51) Int. Cl.
*G06F 7/00* (2006.01)
(52) U.S. Cl. ............. 701/67; 701/68; 477/70; 477/169; 477/175

(58) Field of Classification Search .................... 477/70, 477/169, 175; 701/67, 68
See application file for complete search history.

(56) References Cited

U.S. PATENT DOCUMENTS

| 4,271,723 | A | * | 6/1981 | Shaffer | 74/720 |
|---|---|---|---|---|---|
| 5,293,316 | A | * | 3/1994 | Slicker | 701/68 |
| 7,238,142 | B2 | * | 7/2007 | Kurogo et al. | 477/180 |
| 2003/0186779 | A1 | * | 10/2003 | Mori et al. | 477/92 |
| 2004/0033861 | A1 | * | 2/2004 | Wheeler et al. | 477/83 |
| 2006/0040788 | A1 | * | 2/2006 | Bassler | 477/71 |

* cited by examiner

*Primary Examiner* — Mark Hellner

(57) ABSTRACT

A method for controlling a transmission in a motor vehicle during acceleration from an idle condition begins when the vehicle is stationary, the engine is at idle, and the transmission is in the first gear range or ratio. When the vehicle begins to accelerate, the method includes the steps of monitoring the rate of vehicle acceleration and comparing the rate of vehicle acceleration to a rate of vehicle acceleration threshold. If the rate of vehicle acceleration is less than the acceleration threshold, then the transmission allows one of the currently engaged clutches to slip. This clutch slip reduces the torque load on the engine. The method then monitors the engine output speed. If the engine output speed exceeds an engine output speed threshold, then the clutch is fully applied.

8 Claims, 2 Drawing Sheets

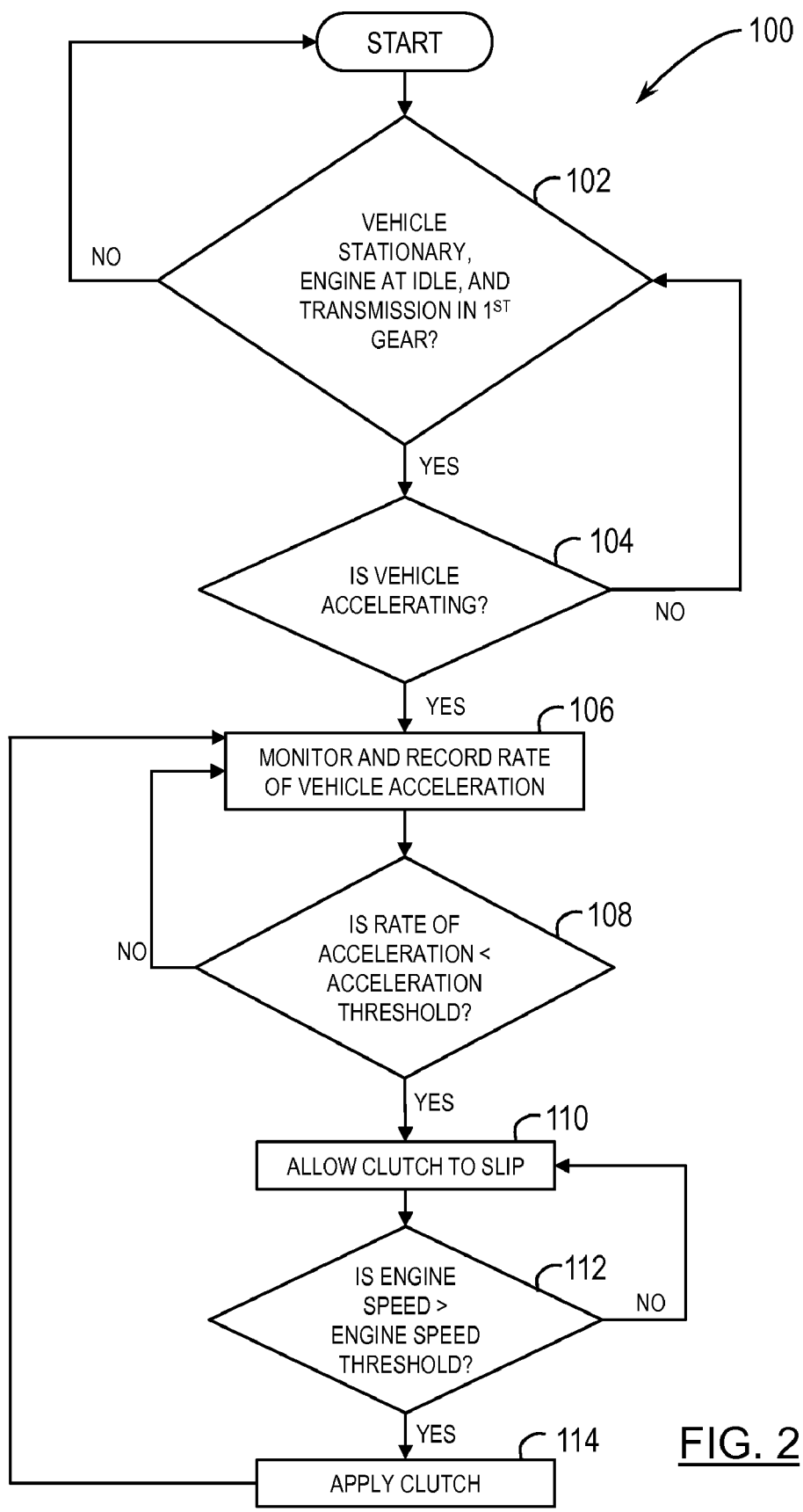

METHOD FOR CONTROLLING A TRANSMISSION DURING ACCELERATION FROM IDLE

CROSS-REFERENCE TO RELATED APPLICATIONS

Figure 1:
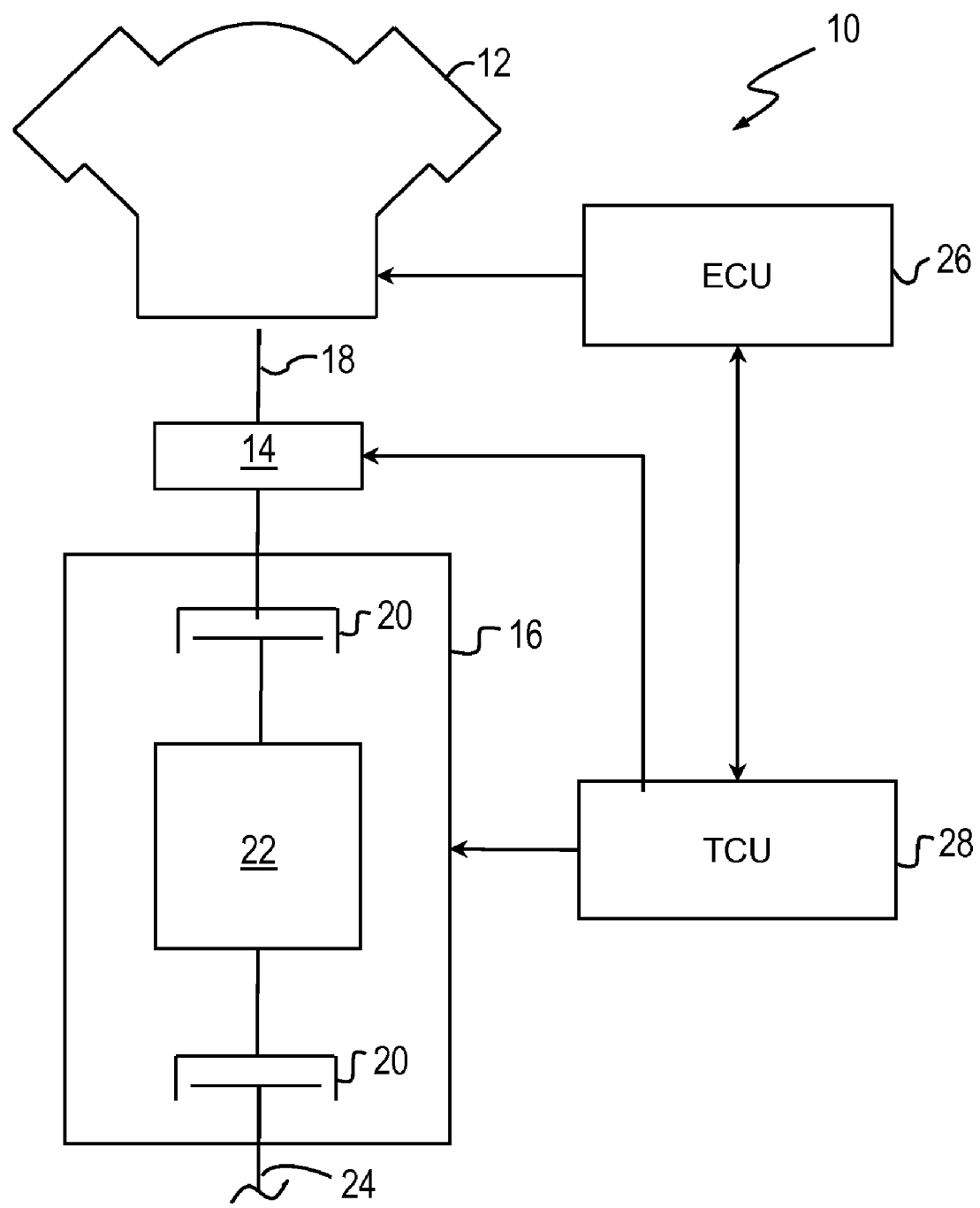

This application claims the benefit of U.S. Provisional Application No. 61/052,483, filed on May 12, 2008. The disclosure of the above application is incorporated herein by reference.

FIELD

The present disclosure relates to controlling a transmission, and more particularly to a method for controlling engagement of torque transmitting devices in a transmission during vehicle acceleration from idle.

BACKGROUND

The statements in this section merely provide background information related to the present disclosure and may or may not constitute prior art.

Many motor vehicles use torque converters in order to provide a fluid coupling between the output of an engine and the input of a transmission in order to multiply torque when there is a substantial difference between input and output rotational speeds, thereby providing the equivalent of a reduction gear. The process of selecting a torque converter for a specific engine-transmission combination begins with an evaluation of the stall turbine torque and the converter speed ratio of the torque converter at the engine's full load governed speed with respect to the transmission's ratings. The traditional approach has been to optimize vehicle performance, and thus the recommended torque converter is the one which provides the maximum turbine torque while not exceeding these ratings. An additional consideration involves the engine's ability to accelerate from idle against the stall capacity of the torque converter. Many of the current commercial diesel engines are limited in their ability to generate enough torque at low speed to accelerate properly from idle stall when the vehicle is operating near its gross vehicle rating. This issue results in the use of lower capacity torque converters. Also, the increasing emphasis on fuel economy has resulted in more interest in the use of higher capacity torque converters.

Accordingly, there is a need in the art for a method for controlling a transmission during acceleration from idle that reduces the effective stall capacity of the torque converter in order to allow the engine to accelerate to a speed where it can generate sufficient torque to adequately accelerate the vehicle. This method will allow the use of higher capacity torque converters in a given engine-transmission combination, thereby resulting in improved fuel economy and vehicle performance.

SUMMARY

The present invention provides a method for controlling a transmission in a motor vehicle during acceleration from an idle condition. The method begins when the vehicle is stationary, the engine is at idle, and the transmission is in the first gear ratio. When the vehicle begins to accelerate, the method includes the steps of monitoring the rate of vehicle acceleration and comparing the rate of vehicle acceleration to a rate of vehicle acceleration threshold. If the rate of vehicle acceleration is less than the acceleration threshold, then the transmission allows one of the currently engaged clutches to slip. This slip reduces the torque load on the engine. The method then monitors the engine output speed. If the engine output speed exceeds an engine output speed threshold, then the clutch is again fully applied.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a schematic diagram of a exemplary powertrain employing a transmission control method according to the principles of the present invention; and FIG. 2 is a flow chart illustrating the transmission control method of the present invention.

DETAILED DESCRIPTION

The following description is merely exemplary in nature and is not intended to limit the present disclosure, application, or uses.

With reference to FIG. 1 an exemplary powertrain is generally indicated by reference number 10. The powertrain 10 is preferably employed in a motor vehicle (not shown). The powertrain 10 includes an engine 12, a torque converter 14, and a transmission 16. It should be appreciated that the powertrain 10 may also include driveshafts, differentials, and a final drive unit without departing from the scope of the present invention. The engine 12 is, for example, an internal combustion engine or electric engine that generates a driving force or engine torque to an engine output shaft 18. It should be appreciated that the engine 12 may be a hybrid combustion/electric engine or any other type of prime mover without departing from the scope of the present invention.

The torque converter 14 is coupled to the engine output shaft 18 and to the transmission 16. The torque converter 14 is operable to transfer the driving force or engine torque from the engine output shaft 18 to the transmission 16. The torque converter 14 transfers engine torque using either a fluid coupling or a direct mechanical coupling using a torque converter lockup clutch, also known as a TCC. During fluid coupling or converter mode, the engine torque is transferred through a transmission fluid in the torque converter 14. When the torque converter clutch is applied, a direct mechanical connection is created between the engine 12 and the transmission 16. It should be appreciated that various kinds and models of torque converters may be employed without departing from the scope of the present invention. The torque converter 14 places a torque load on the engine output shaft 18.

The transmission 16 is preferably an automatic transmission having a plurality of torque transmitting devices 20 interconnected with a plurality of gear sets 22. While only two torque transmitting devices 20 have been schematically illustrated in FIG. 1, it should be appreciated that any number of additional torque transmitting devices may be employed. The torque transmitting devices 20 are clutches in the example provided, but may also include brakes, synchronizers, and various other devices without departing from the scope of the present invention. Likewise, the gear sets 22 may include various kinds of gear assemblies such as co-planar gears or planetary gear sets without departing from the scope of the present invention. The transmission 16 is operable to provide a reverse, park, and neutral gears as well as a plurality of forward and reverse gear ratios by selective engagement of the torque transmitting devices 20. Hereinafter, each forward gear ratio is conventionally labeled, from highest to lowest gear ratio, as $1^{st}$ gear, $2^{nd}$ gear, $3^{rd}$ gear, etc. When in a forward or reverse gear ratio, the transmission 16 places a torque load on the engine output shaft 18 that is cumulative with the torque load from the torque converter 14. Output drive torque from the transmission 16 is communicated through an output shaft 24. The output shaft 24 is preferably connected to a final drive unit (not shown).

The powertrain 10 is electronically controlled by an engine control unit (ECU) 26 and a transmission control unit (TCU) 28. The ECU 26 is in electronic communication with the engine 12 and the TCU 28 via a computer aided network or other connection. The ECU 26 is preferably an electronic device having a preprogrammed digital computer or processor, control logic, memory used to store data, and at least one I/O section. The control logic includes a plurality of logic routines for monitoring, manipulating, and generating data as well as controlling the components of the engine 12, such as valve timing and fuel injection. Additionally, the ECU 26 is operable to receive data signals from a plurality of sensors (not shown) throughout the engine 12 and the motor vehicle including a data signal indicative of the output engine speed and vehicle speed or acceleration. The TCU 28 is also preferably an electronic device having a preprogrammed digital computer or processor, control logic, memory used to store data, and at least one I/O section. The control logic includes a plurality of logic routines for monitoring, manipulating, and generating data as well as controlling the components of the transmission 16 typically through electronically controlled solenoids. Additionally, the TCU 28 is operable to receive data signals from a plurality of sensors (not shown) throughout the transmission 16 including a data signal indicative of the current transmission gear ratio.

Turning now to FIG. 2 and with continued reference to FIG. 1, a transmission control method is illustrated and generally indicated by reference number 100. The steps of the method 100 correspond to control logic used by the ECU 26 and/or the TCU 28 during the method 100. The method 100 is operable to selectively reduce the torque load on the engine 12 during acceleration, thereby allowing the motor vehicle to use a higher capacity torque converter 14 with the specific engine 12 and transmission 16 configuration without sacrificing vehicle acceleration performance. The method 100 begins at step 102 where the ECU 26 and/or TCU 28 determine whether the motor vehicle is stationary, the engine 12 is at idle, and the transmission 16 is in $1^{st}$ gear. The motor vehicle is determined to be stationary when the vehicle speed is sensed to be at or near zero. The vehicle speed is preferably determined via output signals communicated electronically to the ECU 26 from vehicle speed sensors. The engine 12 is at idle when the engine output speed is determined to be at or near an engine idle speed. The engine output speed is preferably determined via output signals communicated electronically to the ECU 26 from engine speed sensors. The current operating range of the transmission 16 is communicated via data signals to the TCU 28. If the vehicle is not stationary, the engine is not at idle, or the transmission is not in the $1^{st}$ gear range, then the method 100 repeats step 102 and provides a continuous monitoring of the motor vehicle.

If the vehicle is stationary, the engine is at idle, and the transmission is in $1^{st}$ gear, then the method proceeds to step 104 and continuously monitors whether or not the motor vehicle is accelerating. If the motor vehicle is not accelerating, the method repeats steps 102 and 104. If the motor vehicle begins to accelerate, the method 100 proceeds to step 106 where the ECU 26 monitors and records or stores the rate of vehicle acceleration. In an alternate embodiment, the method 100 proceeds to step 106 only when the vehicle acceleration occurs when the vehicle is at full throttle (i.e. the ECU 26 determines the accelerator pedal is fully engaged by a throttle sensor).

Next, at step 108, the ECU 26 determines whether the rate of acceleration that is recorded at step 106 exceeds a rate of acceleration threshold. The rate of acceleration threshold is a predefined value stored in the ECU 26. Rates of acceleration below the rate of acceleration threshold correspond to an amount of motor vehicle acceleration that is insufficient or undesirable due to excessive torque load on the engine 12 from the transmission 16 and torque converter 14. In an alternate embodiment, the method 100 may use the acceleration values rather than or in combination with the rates of acceleration to determine whether there is undesirable motor vehicle acceleration performance. If the rate of acceleration recorded at step 106 exceeds the rate of acceleration threshold, then the method 100 repeats steps 106 and 108 in order to continuously monitor the rate of acceleration of the vehicle. If, however, the rate of acceleration does not exceed the rate of acceleration threshold, then the method 100 proceeds to step 110.

At step 110, the TCU 28 communicates with the transmission 16 to allow one of the plurality of clutches 20 to slip. The particular clutch 20 that is allowed to slip is governed by which of the plurality of clutches 20 are engaged during the $1^{st}$ gear ratio. The slipping of one of the clutches 20 reduces the amount of torque transmitted through the clutch 20 and then on to the output shaft 24. This reduced torque load is transmitted through the transmission 16, through the torque converter 14, and to the engine 12. By reducing the torque load on the engine 12, the engine 12 is able to increase in speed. At step 112, the ECU 26 compares the current engine output speed to an engine speed threshold. The engine speed threshold is a predetermined value that corresponds to an engine speed that is able to generate sufficient torque to properly accelerate the motor vehicle. If the engine speed is less than the engine speed threshold, then the method 100 repeats steps 110 and allows the clutch 20 to continue to slip. If the engine speed becomes greater than the engine speed threshold, the method 100 proceeds to step 114 where the TCU 28 communicates with the transmission 16 to re-apply the clutch 20 that was allowed to slip at step 110. At this point, the engine 12 will be generating enough torque to properly accelerate the vehicle. The method 100 then repeats to step 106 and monitors and records the rate of vehicle acceleration.

The description of the invention is merely exemplary in nature and variations that do not depart from the gist of the invention are intended to be within the scope of the invention. Such variations are not to be regarded as a departure from the spirit and scope of the invention.

We claim the following:

1. A method for controlling a transmission coupled to an engine in a vehicle, the method comprising:
  determining whether the vehicle is stationary and whether the transmission is in a first gear state;
  monitoring a rate of acceleration of the vehicle;
  recording the rate of acceleration of the vehicle;
  comparing the rate of vehicle acceleration to a rate of vehicle acceleration threshold;
  at least partially disengaging an engaged torque transmitting device in the transmission if the rate of vehicle acceleration is less than the acceleration threshold in order to reduce a torque load on the engine;

monitoring an output speed of the engine;

recording an output speed of the engine comparing the output speed of the engine to an engine output speed threshold; and re-engaging the torque transmitting device if the output speed of the engine exceeds the engine output speed threshold.

2. The method of claim 1 further comprising determining whether the engine in the vehicle is at idle prior to monitoring when the vehicle begins to accelerate.

3. The method of claim 1 wherein the rate of acceleration threshold corresponds to a minimum amount of vehicle acceleration that is desired for the vehicle during vehicle acceleration from a stationary position.

4. The method of claim 1 wherein the engine speed threshold is a predetermined value that corresponds to a value of the engine output speed that is able to generate sufficient torque to accelerate the vehicle a desired amount.

5. A system for controlling a transmission in a vehicle, the system comprising:

an engine operable to provide an engine output speed;

a transmission coupled to the engine and having a plurality of gear sets and at least one torque transmitting device that cooperate to provide a plurality of gear ranges;

a controller in communication with the engine and the transmission, the controller having control logic comprising:

a first control logic for determining whether the vehicle is stationary and whether the transmission is in a first gear range;

a second control logic for monitoring when the vehicle begins to accelerate;

a third control logic for monitoring and recording the rate of acceleration of the vehicle;

a fourth control logic for comparing the rate of vehicle acceleration to a rate of vehicle acceleration threshold;

a fifth control logic for at least partially disengaging the torque transmitting device in the transmission if the rate of vehicle acceleration is less than the acceleration threshold in order to reduce a torque load on the engine;

a sixth control logic for monitoring and recording the output speed of the engine;

a seventh control logic for comparing the output speed of the engine with an engine output speed threshold; and an eighth control logic for re-engaging the torque transmitting device if the output speed of the engine exceeds the engine output speed threshold.

6. The system of claim 5 wherein the first control logic includes determining whether the engine in the vehicle is at idle prior to monitoring when the vehicle begins to accelerate.

7. The system of claim 5 wherein the rate of acceleration threshold corresponds to a minimum amount of vehicle acceleration that is desired for the vehicle during vehicle acceleration from a stationary position.

8. The system of claim 5 wherein the engine speed threshold is a predetermined value that corresponds to a value of the engine output speed that is able to generate sufficient torque to accelerate the vehicle a desired amount.

\* \* \* \* \*